(12) United States Patent
Hiraguchi

(10) Patent No.: US 6,749,140 B2
(45) Date of Patent: Jun. 15, 2004

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/353,926

(22) Filed: Jan. 30, 2003

(65) Prior Publication Data

US 2003/0146330 A1 Aug. 7, 2003

(30) Foreign Application Priority Data

Feb. 1, 2002 (JP) ........................................ 2002-025629

(51) Int. Cl.$^7$ ............................................... G11B 15/66
(52) U.S. Cl. ................................. 242/332.8; 242/587.1
(58) Field of Search ........................... 242/332.4, 332.8, 242/348.2, 532.6, 587.1, 587.2; 360/132

(56) References Cited

U.S. PATENT DOCUMENTS

| | | | | |
|---|---|---|---|---|
| 4,426,047 A | | 1/1984 | Richard et al. | |
| 4,432,508 A | * | 2/1984 | Inoue et al. | 242/332.4 |
| 4,555,077 A | * | 11/1985 | Platter et al. | 242/348.2 |
| 4,646,177 A | * | 2/1987 | Sanford et al. | 242/332.4 |
| 5,303,875 A | * | 4/1994 | Hoge et al. | 242/348.3 |
| 5,431,356 A | * | 7/1995 | Horstman et al. | 242/348.2 |
| 5,443,220 A | * | 8/1995 | Hoge et al. | 242/332.8 |
| 5,971,310 A | * | 10/1999 | Saliba et al. | 242/332.4 |
| 6,092,754 A | * | 7/2000 | Rathweg et al. | 242/332.4 |
| 6,135,379 A | * | 10/2000 | Argumedo | 242/348.2 |
| 6,142,402 A | * | 11/2000 | Reilly | 242/332.8 |
| 6,311,916 B1 | * | 11/2001 | Johnson et al. | 242/332.8 |
| 6,375,108 B1 | * | 4/2002 | Drechsler et al. | 242/332.4 |
| 6,565,028 B2 | * | 5/2003 | Sasaki et al. | 242/332.4 |

* cited by examiner

Primary Examiner—William A. Rivera
(74) Attorney, Agent, or Firm—Sughrue Mion, PLLC

(57) ABSTRACT

In a recording tape cartridge, a tape-shaped leader tape which is connected to a distal end of a magnetic tape, and key members which are fixed to transverse direction end portions of the leader tape, form a leader portion. When the magnetic tape is taken-up onto a reel hub of a drive device, the leader tape is accommodated, along an entire length of the leader tape, in a slit of the reel hub, and tape holding portions of the key members are anchored at key grooves of the reel hub. An opening width of the slit at an outer peripheral surface of the reel hub is extremely small. A step, which arises at the magnetic tape which is taken-up on the reel hub, is extremely small.

21 Claims, 7 Drawing Sheets

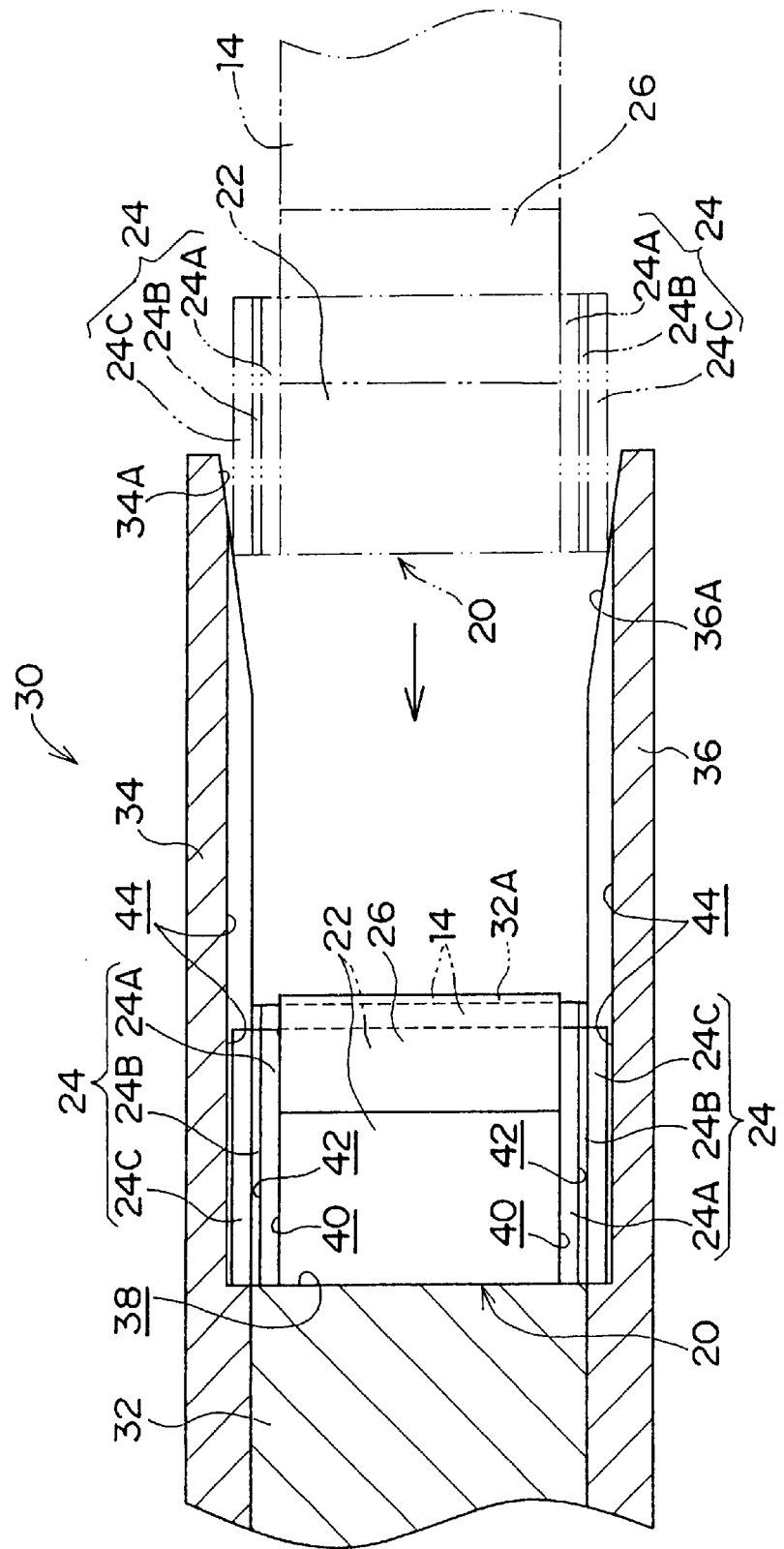

RECORDING TAPE CARTRIDGE

BACKGROUND OF THE INVENTION

1. Field of the Invention

The present invention relates to a recording tape cartridge. In particular, the cartridge rotatably accommodates a single reel on which a recording tape, such as a magnetic tape or the like, is wound. During use, the recording tape is taken-up onto a take-up reel of a drive device.

2. Description of the Related Art

Recording tapes such as magnetic tapes and the like are used as external storage media for computers and the like. There are recording tapes on which a large amount of information can be recorded although the space for accommodating the recording tape during storage thereof is small. A recording tape cartridge, which accommodates, in a case, a single reel on which the recording tape is wound, is used for the recording tape.

When such a recording tape cartridge is used, i.e., when information is to be recorded onto the recording tape or information recorded on the recording tape is to be played back therefrom, the recording tape cartridge is loaded into a drive device. At the drive device in which the recording tape cartridge is loaded, a leader member, which is attached to the distal end of the recording tape, is pulled-out from the case by a pull-out means.

The leader member is guided to a take-up reel of the drive device by the pull-out means. The recording tape is pulled-out successively from the case while being taken-up on to the take-up reel, and recording or playing back of information is carried out by a recording/playback head or the like disposed along a predetermined tape path.

A leader block, which is formed in a block-shape, is an example of the above-described leader member. Further, a leader pin, which is shaped as a small, solid cylinder, and a leader tape, which is formed in a thick tape-shape which is thicker than the recording tape, are also known as other leader members.

In a recording tape cartridge having a leader block, when the recording tape is taken-up onto the take-up reel, the leader block is accommodated within a reel hub of the take-up reel. A curved end surface of the leader block, together with the outer peripheral surface of the reel hub, forms the take-up surface for the recording tape.

However, the leader block is a member of the recording tape cartridge. At each recording tape cartridge which is loaded into the drive device, there are individual differences in the accuracy of the dimensions of the leader block. Thus, the degree of smoothness of the take-up surface on which the recording tape is taken-up depends on the dimensional accuracy of each leader block. The drive device cannot absorb these individual differences in the dimensional accuracies of leader blocks. Thus, there are cases in which a step, which is unacceptable, arises between the end surface of the leader block and the take-up surface of the reel hub, i.e., the edge portion of the opening of the leader block accommodating portion of the reel hub.

Such a step causes a step (a fold or deformation) in the recording tape which is taken up. This step similarly arises at the portion of the recording tape which is wound up as the next layer or subsequent layers and which is substantially a recording region. At the portion of the recording tape where such a step arises, in the process of recording or playing back information, an appropriate distance with the recording/playback head cannot be maintained. Accordingly, such a deformed portion results in the formation of regions at which information cannot be recorded, or results in the loss of recorded information.

In particular, the opening width of the accommodating portion of the reel hub which accommodates the block-shaped leader block is large. For example, in the case of a 12.7 mm wide recording tape, the opening width at the outer peripheral portion of a reel hub having a diameter of 50 mm is about 12 mm. Accordingly, the effects caused by individual differences in the dimensions of leader blocks is great, and the probability that the above-described problems will occur is high.

Moreover, in a recording tape cartridge having a leader pin, when the recording tape is taken-up onto the take-up reel, the leader pin is, together with a leader block forming the pull-out means of the drive device, accommodated within the reel hub of the take-up reel. The curved end surface of the leader block of the drive device, together with the outer peripheral surface of the reel hub, forms the take-up surface for the recording tape. This leader block is structured to move from a position at which the leader block catches the leader pin which is accommodated within the case (the recording tape cartridge), to a position of being accommodated within the reel hub, by, for example, a cam mechanism or an arm mechanism having a pin which engages with a pass-through hole of the leader block.

In this structure, the leader block, which is a member of the drive device, forms a portion of the take-up surface. Thus, in other words, the leader block, together with the reel hub, form portions of the drive device, and are provided in a one-to-one correspondence. Accordingly, the step at the take-up surface is not affected by the individual differences in dimensional accuracies of leader pins, which are parts of recording tape cartridges.

However, the leader block which forms the pull-out means can move within the reel hub in order to cancel engagement of the pin and the pass-through hole in the state in which the leader block is accommodated in the reel hub, in order for the cam mechanism and the like to not impede rotation of the reel hub. This is not a structure in which positioning is carried out by the leader block abutting the reel hub. Thus, there are cases in which accurate positioning within the reel hub cannot be carried out due to the accumulation of operational errors of a plurality of cam mechanisms or arm mechanisms caused by a complex path corresponding to the predetermined tape path being moved by the plurality of cam mechanisms or arm mechanisms.

Namely, in this structure, there are cases in which a step arises due to the deformed portion of the tape between the leader block end surface and the take-up surface, i.e., the edge portion of the opening of the leader block (leader pin) accommodating portion of the reel hub, due to the positioning accuracy of the leader block of the drive device with respect to the reel hub.

Moreover, in a recording tape cartridge having a leader tape, in a state in which one end portion of a tape-shaped take-up leader, whose other end portion is fixed to the reel hub of the take-up reel, has entered into an engagement hole of the leader tape and has caught on the leader tape, the recording tape is taken-up onto the reel hub together with the leader tape and the take-up leader. In this structure, the recording tape is taken-up on the take-up leader and the leader tape which are taken-up on the reel hub. Accordingly, there are hardly any cases in which a step of the leader hub itself becomes a problem.

However, the one end portion of the take-up leader enters in (passes through) the engagement hole of the leader tape. In other words, taking-up onto the reel hub is carried out in a state which is as if respective end portions of the leader tape and the take-up leader, which are both thicker than the recording tape, are superposed together. Thus, a step which is a cause of deformation of a tape arises at this superposed portion. Accordingly, in a structure having a leader tape, there has been the need for a special countermeasure, such as making the leader tape long and winding it several times at the step portion, in order to prevent the deformation.

SUMMARY OF THE INVENTION

In view of the aforementioned, an object of the present invention is to provide a recording tape cartridge which can make small the step which arises at a recording tape at the time when the recording tape is taken-up onto a reel hub of a drive device.

In order to achieve the above-described object, a recording tape cartridge relating to the present invention comprises: a recording tape which is wound on a single reel rotatably accommodated in a case, and at which one of recording of information and playback of information is carried out while the recording tape is being taken-up onto a reel hub of a drive device; a leader member formed in a thin-plate shape and connected to a distal end of the recording tape, and when the recording tape is taken-up onto the reel hub, the leader member is accommodated along an entire length of the leader member in a slit which opens at an outer peripheral surface of the reel hub; and an engaging portion provided at a transverse direction end portion of the leader member, and positioned at an outer side of the slit at a time when the leader member is accommodated in the slit.

When the recording tape cartridge of the present invention is loaded into a drive device at the time when the recording tape cartridge is to be used, the leader member, which is connected to the distal end of the recording tape, is pulled-out from the case together with the engaging portion. The leader member is accommodated (inserted), along the entire length thereof, into a slit of a reel hub which forms the drive device.

In this state, the engaging portion, which is provided at the transverse direction end portion of the leader member, is positioned at the outer side of the slit (e.g., at the outer side in the axial direction of the reel hub). The engaging portion has at least one of the following functions: a function of positioning the leader member within the case, a function of being anchored (held) at the reel hub, and a function of being manipulated (guided to the reel hub while being grasped or caught or the like) by the pull-out means of the drive device. Or, a member having at least some of the above-described functions is attached to the engaging portion.

In this way, the thin-plate-shaped leader member, including the region thereof connected with the recording tape, is accommodated in the slit without projecting out from the opening portion of the slit at the outer peripheral surface of the reel hub. When the reel hub is driven to rotate in this state, the recording tape is successively pulled-out from the case while being taken-up onto the outer peripheral surface of the reel hub, and information is recorded or played back by a recording/playback head or the like disposed along a predetermined tape path.

Here, because the leader member is thin-plate-shaped, the slit in which the leader member is accommodated can be made to be thin. There is no need for the slit to accommodate the engaging portion which is provided at the transverse direction end portion of the leader member. In other words, the rectilinear portion which connects the circumferential direction both edge portions of the opening portion of the slit at the outer peripheral surface of the reel hub can be made to be short. Thus, at this opening portion of the slit as well, the recording tape is taken-up (trained) substantially along the circumference prescribing the outer periphery of the reel hub, and no step which would cause deformation is formed at the recording tape.

The entire length of the leader member is inserted into the slit. In other words, at (the longitudinal direction or thickness direction end surface of) the leader member, the recording tape is not trained at the outer side of the reel hub. Thus, no step arises at the take-up surface due to differences in dimensions of individual leader members or due to the positional accuracy within the slit. The thickness of the leader member does not cause a step at the take-up surface.

In this way, in the recording tape cartridge of the present invention, when a recording tape is taken-up onto a reel hub of a drive device, a step which may be formed at the recording tape can be made to be small.

BRIEF DESCRIPTION OF THE DRAWINGS

FIG. 6 is a side sectional view showing a state in which the leader tape and the key members, which form the recording tape cartridge relating to the embodiment of the present invention, are accommodated in and anchored at a reel hub of the take-up reel.

DESCRIPTION OF THE PREFERRED EMBODIMENT

A recording tape cartridge 10 relating to an embodiment of the present invention will be described hereinafter on the basis of FIGS. 1 through 7B.

Figure 1:
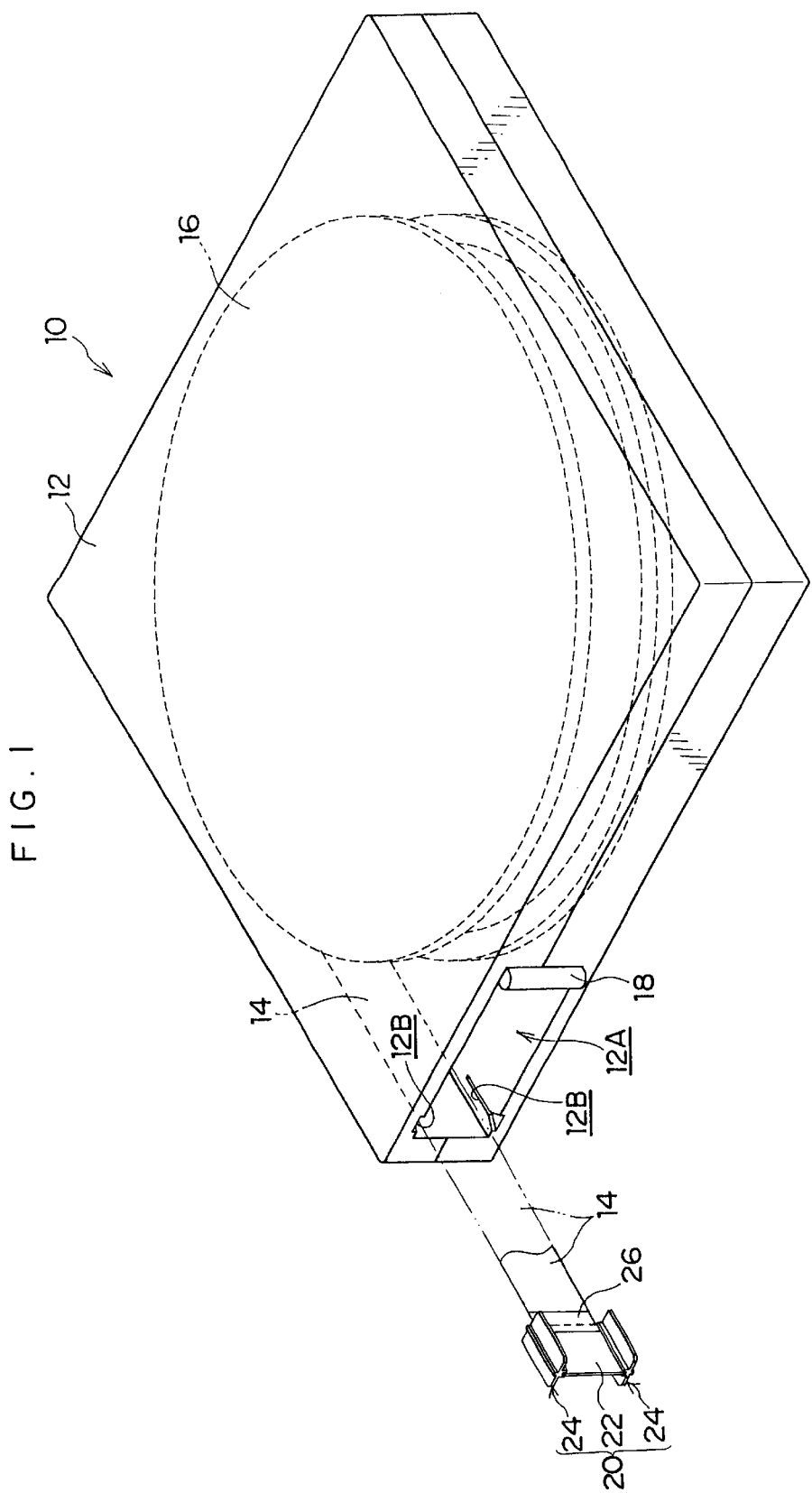
FIG. 1 is perspective view showing an overall schematic structure of a recording tape cartridge relating to an embodiment of the present invention.

In FIG. 1, the overall schematic structure of the recording tape cartridge 10 is illustrated in perspective view. As shown in FIG. 1, the recording tape cartridge 10 is structured such that a single reel 16 is rotatably accommodated within a case 12 which is rectangular in plan view. A magnetic tape 14, which serves as a recording tape which is an information recording/playback medium, is wound on the reel 16.

A gear opening which exposes a reel gear of the reel 16 is formed in the bottom surface of the case 12. (Neither the gear opening nor the reel gear is illustrated). Due to the reel gear meshing with a drive gear of a drive device, the reel 16 is driven to rotate within the case 12.

An opening 12A, which is opened and closed by a sliding door 18, is formed at the case 12. The opening 12A allows the magnetic tape 14 to be pulled-out. A pair of upper and lower holding grooves 12B facing the exterior are formed at the outer sides of the upper and lower edge portions of the opening 12A. Positioning projections 24C of key members 24, which will be described later, can be anchored at and removed from the holding grooves 12B while sliding. The end portions of the holding grooves 12B facing the outer side widen in taper forms.

Figure 2:
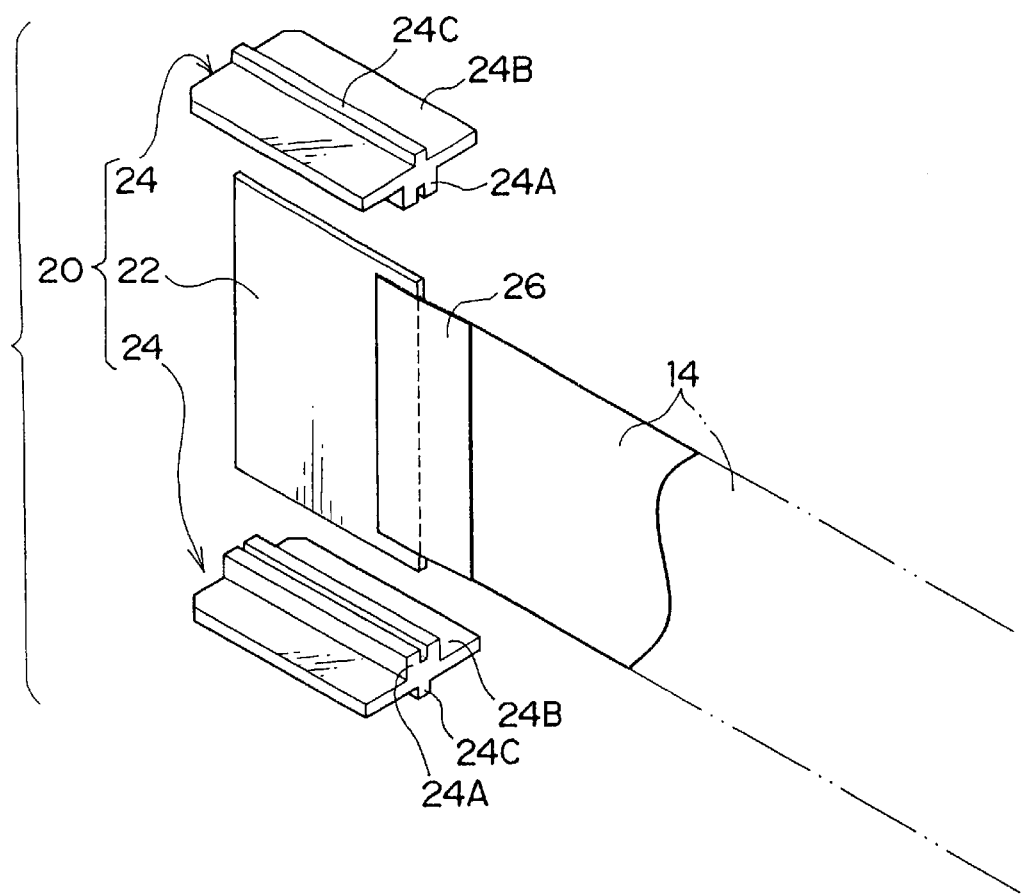
FIG. 2 is an exploded perspective view showing a leader tape and key members forming the recording tape cartridge relating to the embodiment of the present invention.

As shown in FIG. 2, a leader portion 20 is provided at the distal end of the magnetic tape 14. The leader portion 20 has a leader tape 22 and the pair of upper and lower key members 24. The leader tape 22 is formed in a tape-shape or a thin-plate-shape and serves as a leader member. The key members 24 serve as engaging portions and are fixed to the transverse (vertical) direction end portions of the leader tape 22.

The leader tape 22 is rigid to the extent that it can hold the key members 24 (at least so that it will not buckle when the leader portion 20 is in a free state). Specifically, the leader tape 22 is formed by a thin metal plate or a thin plastic (resin) plate having a thickness of about 0.05 mm to about 0.1 mm. The width of the leader tape 22 is slightly larger than the width of the magnetic tape 14. (In the present embodiment, the width of the magnetic tape 14 is 12.7 mm).

The length of the leader tape 22 is set to be slightly shorter than the length of a slit 38 of a reel hub 32 which will be described later. A splice tape 26, which is an adhesive (pressure-sensitive) tape of the same width as the magnetic tape 14 (the leader tape 22), is adhered to one longitudinal direction end portion of the leader tape 22. The splice tape 26 is adhered to the distal end of the magnetic tape 14 as well.

In this way, the magnetic tape 14 and the leader tape 22 are connected via the splice tape 26 in a state in which the longitudinal direction central lines thereof coincide and the longitudinal direction end portions thereof coincide. Note that, in the present embodiment, the thickness of the magnetic tape 14 is from 6 $\mu$m to 20 $\mu$m, and the thickness of the splice tape 26 is from 15 $\mu$m to 30 $\mu$m.

On the other hand, each key member 24 has a tape holding portion 24A in which a transverse direction end portion of the leader tape 22 can be fit. Each tape holding portion 24A has a length equivalent to that of the leader tape 22, and the longitudinal direction end portions thereof substantially coincide. Further, the transverse direction end portions of the leader tape 22 (the portions projecting further upwardly and downwardly than the transverse direction end portions of the magnetic tape 14), are fixed along substantially their entire lengths to the tape holding portions 24A by adhesion or the like in a state of being fit in the tape holding portions 24A.

The interval over which the upper and lower tape holding portions 24A, which are fixed to the leader tape 22, oppose one another is the same as the width of the magnetic tape 14. The tape holding portions 24A can be inserted into and removed from key grooves 40 of the reel hub 32 which will be described later. In a state in which the tape holding portions 24A are inserted into (anchored at) the key grooves 40, the tape holding portions 24A resist the tension of the magnetic tape 14 which is applied in the circumferential direction (tangential direction) of the reel hub 32.

A manipulation portion 24B, which is for manipulation (grasping, engaging, or the like) by a pull-out means of the drive device, is provided integrally with the side of the tape holding portion 24A opposite the side thereof which is fixed to the leader tape 22. The manipulation portion 24B has a length equivalent to that of the tape holding portion 24A, and is formed in a flat-plate-shape which is symmetrical with respect to the direction of thickness of the leader tape 22 fixed to the tape holding portion 24A. The positioning projection 24C projects at the surface of the manipulation portion 24B at the side opposite the tape holding portion 24A side. The positioning projection 24C is positioned at the transverse direction central portion of the manipulation portion 24B, and can be anchored with and removed from the holding groove 12B of the case 12.

As described above, the respective key members 24 fixed to the leader tape 22 (i.e., the leader potion 20) have all of a function of being anchored at the reel hub 32, a function of being manipulated by the pull-out means, and a function of being positioned (held) at the case 12.

Figure 3:
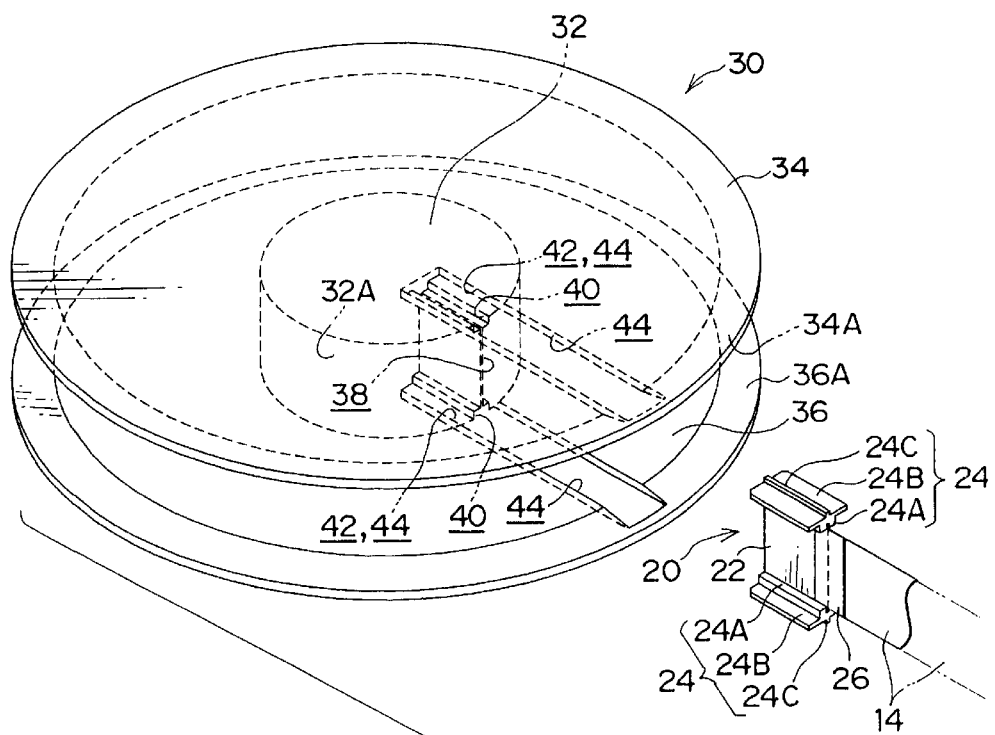
FIG. 3 is a perspective view showing an overall schematic structure of a take-up reel of a drive device on which a magnetic tape of the recording tape cartridge relating to the embodiment of the present invention is taken-up.

Next, a take-up reel 30 of the drive device will be described. The overall schematic structure of the take-up reel 30 is shown in perspective view in FIG. 3. As shown in FIG. 3, the take-up reel 30 is formed to include the reel hub 32 which is round as seen in plan view and whose height (axial direction length) is slightly larger than the width of the magnetic tape 14; and an upper flange 34 and a lower flange 36 which are disk-shaped and are fixed coaxially to the axial (upper and lower) direction end portions of the reel hub 32. Taper portions 34A, 36A are provided at the outer peripheral sides of the upper flange 34 and the lower flange 36, respectively, such that the interval over which the upper flange 34 and the lower flange 36 oppose one another widens.

Figure 4:
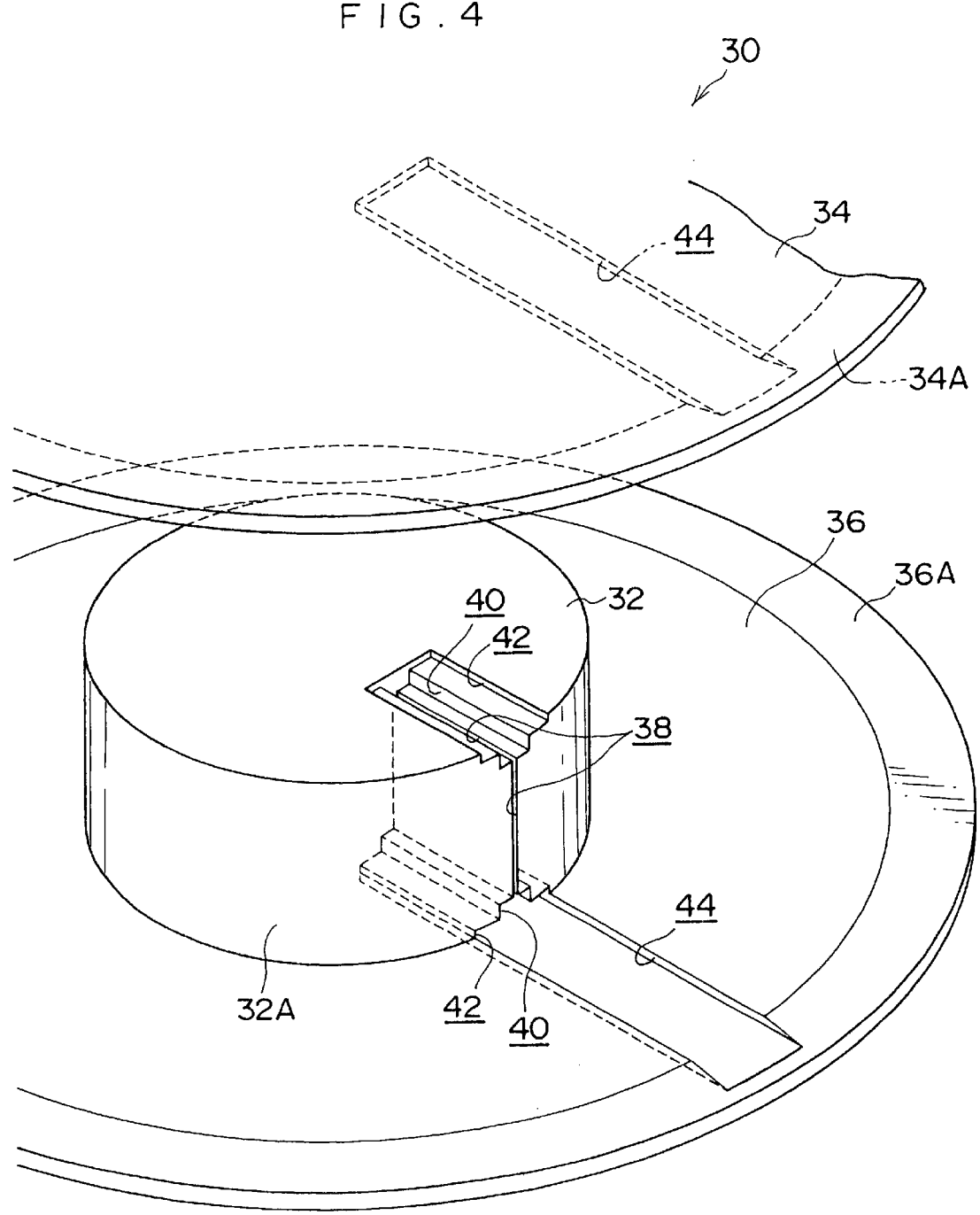
FIG. 4 is a perspective view as seen by cutting away an upper flange of the take-up reel of the drive device on which the magnetic tape of the recording tape cartridge relating to the embodiment of the present invention is taken-up.
Figure 5:
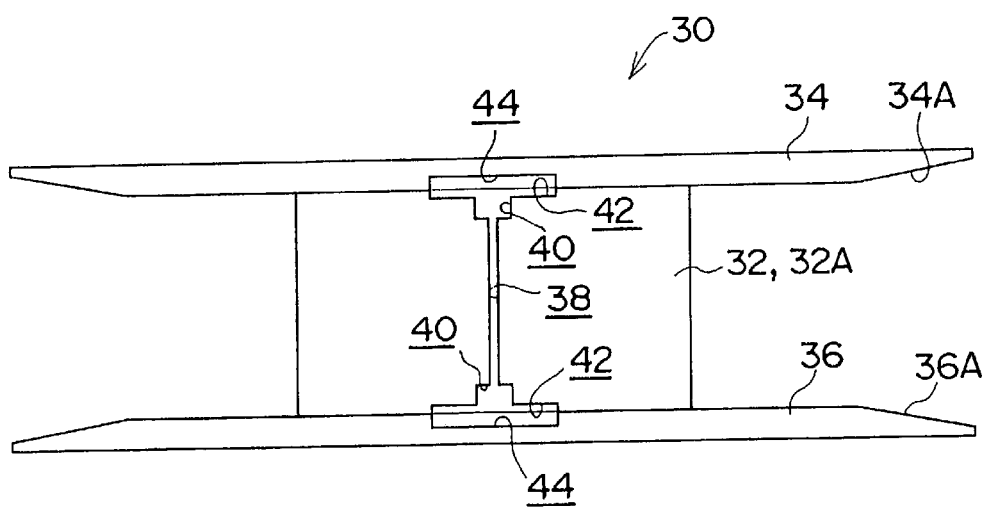
FIG. 5 is a front view showing an overall schematic structure of the take-up reel of the drive device on which the magnetic tape of the recording tape cartridge relating to the embodiment of the present invention is taken-up.

As shown in FIG. 4 (a perspective view from which the upper flange is cut away) and FIG. 5 as well, the narrow slit 38 is formed in the reel hub 32. The slit 38 opens at an outer peripheral surface 32A of the reel hub 32. The longitudinal direction of the slit 38 is the radial direction of the reel hub 32. The length of the slit 38 is slightly longer than the length of the leader tape 22. The width of the slit 38 is slightly larger than the thickness of the leader tape 22 (e.g., the width of the slit 38 is 0.2 mm with respect to the leader tape 22 of a thickness of 0.1 mm). In this way, because the slit 38 is extremely narrow, it can be formed by, for example, one-cut working or the like, and the dimensional accuracy thereof is high.

The key grooves 40 which correspond to the tape holding portions 24A of the key members 24, and concave portions 42 which correspond to the manipulation portions 24B of the key members 24, are formed continuously at the upper and lower ends of the slit 38 (the axial direction ends of the reel hub 32), so as to open at the outer peripheral surface 32A of the reel hub 32. Further, the upper and lower concave portions 42 are open at the upper and lower ends of the reel hub 32, respectively. Note that the inner ends of the slit 38, the key grooves 40, and the concave portions 42 all coincide.

Namely, at the reel hub 32, the height of the slit 38 substantially coincides with the interval over which the upper and lower tape holding portions 24A oppose one another (i.e., the width of the magnetic tape 14). Further, the slit 38 is open at the bottom portions of the upper and lower key grooves 40. In the state in which the tape holding portions 24A and the manipulation portions 24B of the key members 24 have entered into the upper and lower key grooves 40 and concave portions 42 respectively, the leader tape 22 can be accommodated within the slit 38 along the entire length of the leader tape 22 (including the end thereof connected to the magnetic tape 14).

In this way, the magnetic tape 14 is a structure which is not taken-up on portions of the reel hub 32 which are higher or lower than the slit 38 (i.e., is not taken up at the key grooves 40 or the like) (see FIG. 6). Note that, although the widths of the key grooves 40 substantially coincide with the widths of the tape holding portions 24A, the widths of the concave portions 42 are slightly wider than the widths of the manipulation portions 24B.

Relief grooves 44, whose longitudinal directions run along the radial directions of the upper flange 34 and the lower flange 36, are provided in the upper flange 34 and the lower flange 36 so as to oppose one another. The relief groove 44 has the same width as the concave portion 42 of the reel hub 32, and the inner end of the relief groove 44 coincides with the inner end of the concave portion 42. The outer end of the relief groove 44 opens at the outer side in the radial direction at the taper portions 34A, 36A of the upper and lower flanges 34, 36.

As shown in FIG. 6, the depth of each relief groove 44 is greater than the projecting height of the positioning projection 24C of the key member 24. Namely, the interval over which the bottom portions of the upper and lower relief grooves 44 oppose one another is greater than the entire height of the leader portion 20. The relief grooves 44 allow the leader portion 20 to approach and move away from the reel hub 32 along the radial direction.

When the concave portion 42 of the reel hub 32 is sufficiently deeper than the plate thickness of the manipulation portion 24B of the key member 24, the relief groove 44 may be a groove of a width corresponding to the positioning projection 24C of the key member 24. However, by making the relief groove 44 have the above-described dimensions, the manipulation portions 24B can be smoothly anchored and removed (the leader portion 20 can be smoothly made to approach and move away from the reel hub 32 along the radial direction) without forming the concave portion 42 to be deep, and the interval over which the upper and lower flanges 34, 36 oppose one another can be kept small, and transverse direction offset (i.e., downward stepping) of the magnetic tape 14 taken-up on the reel hub 32 can be suppressed.

Next, operation of the present embodiment will be described.

In the recording tape cartridge 10 having the above-described structure, at times when the recording tape cartridge 10 is not in use (such as when the recording tape cartridge 10 is being stored or transported or the like), the opening 12A of the case 12 is closed by the sliding door 18 such that dust and the like can be prevented from entering into the case 12. In this state, the positioning projections 24C of the respective key members 24 of the leader portion 20 are inserted into the holding grooves 12B of the case 12.

When the recording tape cartridge 10 is to be used, i.e., when information is to be recorded onto the magnetic tape 14 or when recorded information is to be played back from the magnetic tape 14, the recording tape cartridge 10 is loaded into a drive device.

At the recording tape cartridge 10 which has been loaded into the drive device, the sliding door 18 moves such that the opening 12A is opened. Then, the pull-out means of the drive device enters into the case 12 from the opening 12A which has been opened. The pull-out means pulls the leader portion 20 out from the case 12 while holding (grasping or anchoring or the like) the upper and lower manipulation portions 24B of the leader portion 20.

The pull-out means guides the leader portion 20 to the take-up reel 30, and, as shown in FIG. 6, passes between the upper and lower relief grooves 44, and makes the leader portion 20 approach the reel hub 32 along the radial direction of the reel hub 32.

Then, when the manipulation portions 24B are inserted into the concave portions 42 such that the upper and lower tape holding portions 24A enter into the key grooves 40 of the reel hub 32, accompanying this insertion, the leader tape 22 is inserted into and accommodated in the slit 38. As shown in FIG. 6 and FIG. 7B, when the leader tape 22 is accommodated within the slit 38 along the entire length of the leader tape 22 (up to the end connected to the magnetic tape 14), the pull-out means withdraws to a position at which it does not interfere with rotation of the take-up reel 30.

Figure 7A:
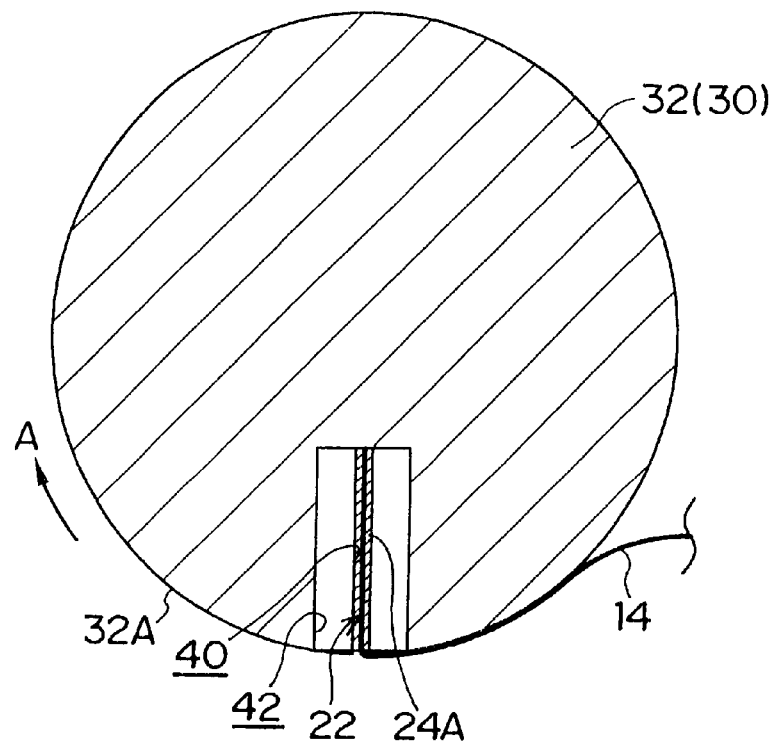
FIG. 7A is a plan sectional view showing a state in which the leader tape, which forms the recording tape cartridge relating to the embodiment of the present invention, is accommodated in the reel hub of the take-up reel.
Figure 7B:
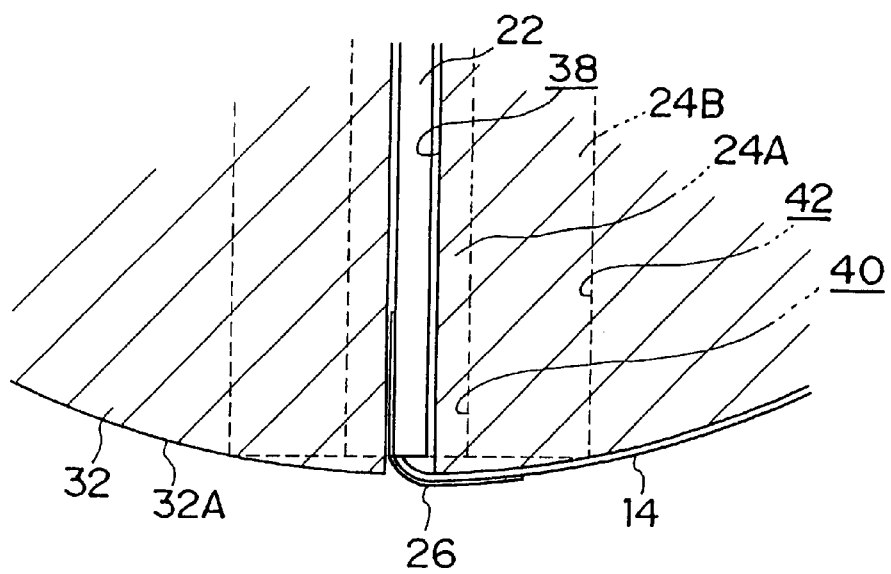
FIG. 7B is an enlarged view of main portions showing a state in which the leader tape, which forms the recording tape cartridge relating to the embodiment of the present invention, is accommodated in the reel hub of the take-up reel.

In this state, when the take-up reel 30 is rotated in the direction of arrow A in FIG. 7A synchronously with the reel 16, the magnetic tape 14 is successively pulled-out from the case 12 while being taken-up onto the outer peripheral surface 32A of the reel hub 32. Information is recorded or recorded information is played back by the recording/playback head (magnetic head) disposed along the predetermined tape path.

Here, because the leader tape 22 of the leader portion 20 is tape-shaped (thin-plate-shaped), the width of the slit 38, which serves as a leader member accommodating portion provided at the reel hub 32 of the drive device (i.e., the opening width at the outer peripheral surface 32A), can be made to be extremely small. Therefore, even if the magnetic tape 14 is trained linearly at the opening portion of the slit 38, the linear portion is extremely short and substantially coincides with the circumference which prescribes the outer peripheral surface 32A, such that the magnetic tape 14 is taken-up (trained) substantially along the circumference. In this way, the step (fold or deformation or the like) arising at the magnetic tape 14 is extremely small, and this step does not become a cause of deformation of the tape.

There is no need to form a take-up surface which takes-up the magnetic tape 14, by the member which enters into the narrow slit 38. The longitudinal direction end surface of the leader tape 22, which enters into the slit 38 along the entire length of the leader tape 22, does not form the take-up surface on which the magnetic tape 14 is taken-up. Therefore, a step is not formed at the take-up surface due to individual differences or due to the positional accuracy within the slit 38.

Further, the leader tape 22 is accommodated in the slit 38 along the entire length of the leader tape 22 (until the end thereof which is connected to the magnetic tape 14), and does not project out at the outer peripheral surface 32A. In other words, the magnetic tape 14 is not trained around a thickness direction end surface of the leader tape 22. Thus, the thickness of the leader tape 22 does not cause a step in the magnetic tape 14 which is taken-up onto the reel hub 32.

In this way, in the recording tape cartridge 10 relating to the present embodiment, the step, which arises at the magnetic tape 14 at the time when the magnetic tape 14 is taken-up onto the reel hub 32 of the drive device, can be kept small.

Specifically, in the present embodiment, as shown in FIG. 7B, the step which arises at the magnetic tape 14 can be suppressed to a thickness which substantially corresponds to the sum of the thicknesses of the magnetic tape 14 and the splice tape 26 (a step of an extent such that the problem of deformation of the tape does not arise). Note that, if the splice tape 26 is structured so as to enter into the slit 38 along the entire length of the splice tape 26 (e.g., if the splice tape 26 is structured to connect the magnetic tape 14 to an intermediate portion of the leader tape 22), the step can be suppressed to the thickness of the magnetic tape 14.

Note that, in the above-described embodiment, the key members 24 serving as engaging portions are provided at the both transverse direction end portions of the leader tape 22. However, the present invention is not limited to the same. Provided that the engaging portion is positioned at the outer side of the slit 38 in the state in which the leader tape 22 is accommodated in the slit 38 (i.e., provided that the engaging portion does not result in widening the opening width of the slit 38 at the outer peripheral surface 32A), an engaging portion of any dimension or configuration may be provided. (The engaging portion may be a separate member from, or may be provided integrally with the leader tape 22). It is possible to provide such an engaging portion (including the key member 24) at only one transverse direction end portion of the leader tape 22.

It goes without saying that the engaging portion is not limited to the preferable structure which has all of the function of being positioned at the holding groove 12B of the case 12, the function of being manipulated by the pull-out means of the drive device (being pulled-out from the case 12 while being grasped, engaged and held, or the like), and the function of being anchored at the reel hub 32. Accordingly, for example, an engagement piece, which extends in the transverse direction of the leader tape 22 may be provided as the engaging portion. In the state in which this engagement piece is grasped by the pull-out means (i.e., resists the tension of the magnetic tape 14), the reel hub 32 is driven to rotate, and when the magnetic tape 14 is taken-up by a predetermined amount onto the reel hub 32, the grasping by the pull-out means is released. In this way, it is possible to structure the engagement piece such that the engagement piece does not have the function of being anchored at the reel hub 32.

Further, the engaging portion in the present invention may be a portion which is provided at the leader tape 22 and does not enter into the slit 38, and does not have all or some of the above-described three functions, but rather, is for attaching a member (e.g., the key member 24) which has at least some of the above-described three functions. (For example, the engaging portion may be a portion, which projects further than the transverse direction end portion of the magnetic tape 14, at the leader tape 22 in the above-described embodiment.)

The material and the thickness of the leader tape 22 are not limited to the material and thickness in the above-described embodiment. The material and the thickness of the leader tape 22 may be determined in accordance with the width of the slit 38 which is permitted in accordance with the required strength and in accordance with the thickness of the magnetic tape 14 (the width of the slit 38 which does not cause deformation of the tape).

Moreover, in the above-described embodiment, the leader tape 22 is structured so as to be connected to the magnetic tape 14 via the splice tape 26. However, the present invention is not limited to the same. For example, the magnetic tape 14 may be connected in a state of being sandwiched between the leader tape 22 and the splice tape 26, or the leader tape 22 or the like and the magnetic tape 14 may be directly connected by ultrasonic welding, heat sealing, adhesion, or the like.

In the above-described embodiment, the magnetic tape 14 is used as the recording tape. However, the present invention is not limited to the same. It suffices to interpret the recording tape as being an information playback/recording medium which is elongated and tape-shaped, and on which information can be recorded and from which recorded information can be played back. It goes without saying that the recording tape cartridge relating to the present invention can be applied to recording tapes of any recording/playback methods.

As described above, the recording tape cartridge relating to the present invention has the excellent effect that, when a recording tape is taken-up onto a reel hub of a drive device, a step arising at the recording tape can be made to be small.

What is claimed is:

1. A recording tape cartridge comprising:
   a recording tape which is wound on a single reel rotatably accommodated in a case, and at which one of recording of information and playback of information is carried out while the recording tape is being taken-up onto a reel hub of a drive device;
   a leader member formed in a thin-plate shape and connected to a distal end of the recording tape, and when the recording tape is taken-up onto the reel hub, the leader member is accommodated along an entire length of the leader member in a slit which opens at an outer peripheral surface of the reel hub; and
   an engaging portion provided at a transverse direction end portion of the leader member, and positioned at an outer side of the slit at a time when the leader member is accommodated in the slit,
   wherein the leader member includes a leader tape, and the reel includes a take-up reel having a disc-shaped upper flange and a disc-shaped lower flange, and the engaging portion includes a tape holding portion in which a transverse direction end portion of the leader tape can be fit, and a manipulation portion for being manipulated by the drive device.

2. The cartridge of claim 1, wherein the recording tape is a magnetic tape.

3. The cartridge of claim 1, wherein the engaging portion is provided integrally with the leader member.

4. The cartridge of claim 1, wherein the engaging portion is provided at one end of a width of the leader member.

5. The cartridge of claim 1, wherein the leader tape is formed from one of metal and resin, and a thickness of the leader tape is from 0.05 mm to 0.1 mm.

6. The cartridge of claim 1, wherein a width of the leader tape is slightly larger than a width of the recording tape.

7. The cartridge of claim 1, wherein the tape holding portion includes a same length as the leader tape, and an entire length of the transverse direction end portion of the leader tape is fit into and fixed to the tape holding portion, and the manipulation portion includes a same length as the tape holding portion and is shaped as a flat plate which is symmetrical with respect to a direction of thickness of the leader tape.

8. The cartridge of claim 7, wherein the slit includes a longitudinal direction along a radius of the reel hub, and a length of the slit is slightly longer than a length of the leader tape, and a width of the slit is slightly larger than a thickness of the leader tape, and a key groove corresponding to the tape holding portion of the engaging portion, and a concave portion corresponding to the manipulation portion of the engaging portion, are provided at upper and lower ends of the slit and open at the outer peripheral surface of the reel hub.

9. The cartridge of claim 8, wherein each of the upper flange and the lower flange includes a relief groove, and the relief groove includes a longitudinal direction along the radius of the upper flange and the lower flange, and the relief groove includes a same width as the concave portion of the reel hub, and an interval over which bottom portions of the relief grooves oppose one another is larger than a combined height of the leader member and the engaging portion.

10. The cartridge of claim 1, further comprising a splice tape that connects the leader tape to the recording tape.

11. A recording tape cartridge having a single reel rotatably accommodated within a rectangular case, said recording tape cartridge comprising:

a recording tape wound on the reel, and recording of information and playback of information are carried out at the recording tape while the recording tape is being taken-up onto a reel hub of a drive device in which said recording tape cartridge is loaded;

a leader tape connected to a distal end of the recording tape, and when the recording tape is taken-up onto the reel hub, an entire length of the leader tape is accommodated in a slit which opens at an outer peripheral surface of the reel hub; and a key member provided at at least one end of the leader tape, and being positioned at an outer side of the slit when the leader tape is accommodated in the slit, wherein the key member includes a tape holding portion in which a transverse direction end portion of the leader tape can be fit, and a manipulation portion for being manipulated by the drive device.

12. The cartridge of claim 11, wherein a pair of key members are provided at ends of the leader tape.

13. The cartridge of claim 11, wherein the key member is provided integrally with the leader tape.

14. The cartridge of claim 11, wherein the recording tape is a magnetic tape.

15. The cartridge of claim 11, wherein the reel includes a take-up reel having a disc-shaped upper flange and a disc-shaped lower flange.

16. The cartridge of claim 15, wherein the tape holding portion includes a same length as the leader tape, and an entire length of the transverse direction end portion of the leader tape is fit into and fixed to the tape holding portion, and the manipulation portion includes a same length as the tape holding portion and is shaped as a flat plate which is symmetrical with respect to a direction of thickness of the leader tape.

17. The cartridge of claim 16, wherein the slit includes a longitudinal direction along a radius of the reel hub, and a length of the slit is slightly longer than a length of the leader tape, and a width of the slit is slightly larger than a thickness of the leader tape, and a key groove corresponding to the tape holding portion of the key member, and a concave portion corresponding to the manipulation portion of the key member, are provided at upper and lower ends of the slit and open at the outer peripheral surface of the reel hub.

18. The cartridge of claim 17, wherein each of the upper flange and the lower flange includes a relief groove, and the relief groove includes a longitudinal direction along the radius of the upper flange and the lower flange, and the relief groove includes a same width as the concave portion of the reel hub, and an interval over which bottom portions of the relief grooves oppose one another is larger than a combined height of the leader tape and the key member.

19. The cartridge of claim 11, wherein the leader tape is formed from one of metal and resin, and a thickness of the leader tape is from 0.05 mm to 0.1 mm.

20. The cartridge of claim 11, wherein a width of the leader tape is slightly larger than a width of the recording tape.

21. The cartridge of claim 11, further comprising a splice tape that connects the leader tape to the recording tape.

* * * * *